No. 886,197. PATENTED APR. 28, 1908.
J. W. FILETZ.
PIVOT SCREW FOR SHEARS.
APPLICATION FILED JAN. 28, 1908.

Witnesses;
G. A. Olson
H. S. Austin

Inventor;
Joseph W. Filetz
by
Joshua R. H. Potts.
Atty.

UNITED STATES PATENT OFFICE.

JOSEPH W. FILETZ, OF CHICAGO, ILLINOIS.

PIVOT-SCREW FOR SHEARS.

No. 886,197.     Specification of Letters Patent.     Patented April 28, 1908.

Application filed January 28, 1908. Serial No. 413,133.

*To all whom it may concern:*

Be it known that I, JOSEPH W. FILETZ, a citizen of the United States, residing at Chicago, county of Cook, and State of Illinois, have invented certain new and useful Improvements in Pivot-Screws for Shears, of which the following is a specification.

My invention relates to shears and particularly to the pivot screws for heavy shears such as are used by tailors.

The object of my invention is to provide a pivot screw for shears which may be readily and quickly adjusted to vary the pressure or tension on the blades.

A further object of my invention is to provide a pivot screw as mentioned, with means for locking the same in adjusted position.

A further object of my invention is to provide a device as mentioned, which shall be perfectly smooth, to the end that it shall not present edges or corners to catch in the goods which is being cut.

Other objects will appear hereinafter.

Figure 1:
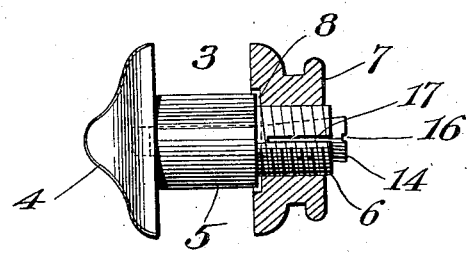
Figure 2:
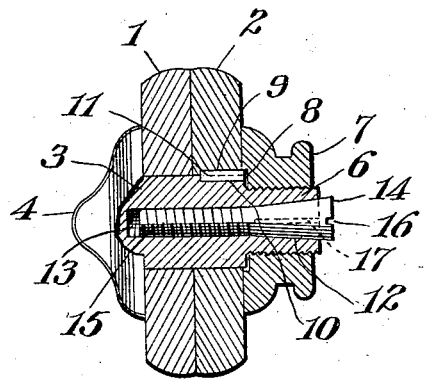
Figure 3:
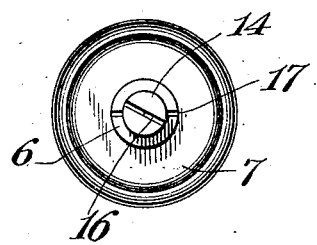

My invention will be more readily understood by reference to the accompanying drawings forming a part of this specification and in which, Figure 1 is a side elevation of a pivot screw or shears embodying my invention in its preferred form, the tension nut being shown in section, Fig. 2 is a similar view, the shank of the screw being in section and the adjacent portions of the blades being shown in position, and Fig. 3 is an end elevation of the device.

Referring to the drawings, 1 and 2 indicate the blades of a pair of shears and 3 the pivot screw. This comprises the head, 4 and the cylindrical shank, 5. The shank, 5 is slightly longer than the combined thicknesses of the blades and terminates in a reduced threaded portion, 6. Threaded upon the portion, 6 is a knurled nut, 7. This impinges against the blade, 2, it being provided with a recess, 8 to receive the end of the portion, 5. By tightening or loosening the nut, 7, which may be readily done with the fingers, the tension of the blades may be adjusted as desired. The blade, 2 which is adjacent to the nut, 7 is provided with a keyway, 9 and the portion, 5 of the screw with a corresponding keyway, 10 to receive a key, 11. It is obvious that the screw and blade, 2 are thus locked together and move together in use, hence, using the shears does not tend to loosen the nut to any great extent.

To positively lock the nut against accidental loosening I provide the following locking means. The portion, 6 of the screw is provided with a conical recess, 12 which terminates in the threaded cylindrical bore, 13 extending into the portion, 5. A cylindrical plug, 14 is arranged within the recess, 12 and is provided with a threaded stem, 15 extending into the bore, 13. The outer end of the plug, 14 is provided with a kerf, 16 to receive a screw driver or other instrument for turning the same. The portion, 6 of the screw is longitudinally split as at 17, hence, by screwing the member 14 into the recess, 12 the portion, 6 is expanded, securely locking the nut. To adjust the tension of the shears, the plug, 14 is slightly loosened after which the nut, 7 may be readily turned. After the desired tension is obtained the plug is again screwed into its socket to tighten the nut.

Having described my invention what I claim as new and desire to secure by Letters Patent is:

1. In a device of the class described, a pair of blades, in combination with a pivot screw extending therethrough and comprising a cylindrical portion extending through said blades and having a head formed upon one end thereof and a threaded extension at the other end, a nut threaded on said extension and a conical plug arranged within said threaded extension and adapted to expand the same to lock said nut, said extension being split, as and for the purpose specified.

2. In a device of the class described, a pair of blades, in combination with a pivot screw extending therethrough and comprising a cylindrical stem portion extending through said blade and having a head formed upon one end thereof and a threaded extension at the other, said extension being split and having a conical socket formed therein, said socket terminating in a threaded cylindrical bore extending into said stem portion, a nut threaded upon said extension and a conical plug fitted in said socket and having a threaded stem extending into said bore, as and for the purpose specified.

In testimony whereof I have signed my name to this specification in the presence of two subscribing witnesses.

JOSEPH W. FILETZ.

Witnesses:
   FRANCES E. SHEEHY,
   HELEN F. LILLES.